United States Patent [19]

Saito

[11] Patent Number: 4,665,445

[45] Date of Patent: May 12, 1987

[54] FLOPPY DISK DRIVE APPARATUS

[75] Inventor: Shunji Saito, Numazu, Japan

[73] Assignee: Tokyo Electric Co., Ltd., Tokyo, Japan

[21] Appl. No.: 849,697

[22] Filed: Apr. 9, 1986

[30] Foreign Application Priority Data

Apr. 23, 1985 [JP] Japan .................................. 60-87152

[51] Int. Cl.$^4$ ............................................ G11B 5/012
[52] U.S. Cl. ...................................................... 360/71
[58] Field of Search ........................................... 360/71

[56] References Cited

FOREIGN PATENT DOCUMENTS 58-141470 9/1983 Japan .
58-141471 9/1983 Japan .
59-218670 12/1984 Japan .

OTHER PUBLICATIONS

IBM Technical Disclosure Bulletin, vol. 22, No. 1, Jun. 1979, pp. 287–290.
Index Amplifier Control for Detecting Diskette in Disk Drive, K. Russell et al.

Primary Examiner—George G. Stellar
Attorney, Agent, or Firm—Frishauf, Holtz, Goodman & Woodward

[57] ABSTRACT

A floppy disk drive apparatus includes a receptacle portion for receiving a jacket which has a notch on an edge portion thereof and houses a floppy disk with an index hole therein; a holding member for holding the floppy disk inserted in the receptacle portion; a disk driver for rotating the floppy disk held by the holding member; an index detector for generating an index detection signal when the jacket is inserted not to exceed a predetermined distance in the receptacle portion through a disk slot, or the index hole is detected; and a notch detector for generating a notch detection signal when the jacket is inserted not to exceed a predetermined distance in the receptacle portion through the disk slot, or the notch of the jacket is detected. The apparatus further includes a control circuit, connected to the index and notch detectors, for generating a non-disk signal representing that the floppy disk is not inserted in the receptacle portion when detecting that the index detection signal is generated from the index detector when the notch detector starts generating the notch detection signal.

7 Claims, 11 Drawing Figures

FLOPPY DISK DRIVE APPARATUS

BACKGROUND OF THE INVENTION

The present invention relates to a floppy disk drive apparatus and, more particularly, to a floppy disk drive apparatus having an insertion state detection function for detecting if a floppy disk is properly inserted in a disk receptacle.

In a conventional magnetic recording apparatus using e.g., a flexible floppy disk as a magnetic recording medium, a clamp is mounted on a spindle motor shaft, and a floppy disk, housed in a substantially square jacket, is inserted through a disk slot and is fixed by the clamp mechanism on the spindle motor shaft. The floppy disk is then rotated at a predetermined speed. A carriage having a magnetic head thereon is radially moved by a stepping motor to cause the magnetic head to read data from or write it on the floppy disk.

The conventional floppy disk drive apparatus is normally connected to a host computer, and the motor rotation control and data access are performed in response to instructions from the host computer. An index signal from a photosensor or index sensor for detecting an index hole formed in the floppy disk is sent back as a floppy disk rotational position signal to the host computer. Write protect data from a notch detector or a photosensor for detecting a rectangular notch formed at a side edge of the jacket, is generated as write/read protect data. Data write access to the floppy disk can be performed in response to the write protect signal and the index signal.

In the conventional floppy disk drive apparatus, the following problems occur. Since the floppy disk housed in the jacket can be detachably inserted in the floppy disk drive apparatus, it is necessary to detect if the floppy disk is inserted in the disk receptacle of the drive apparatus or not. If the floppy disk is inserted in the drive apparatus, an indicator lamp must be turned on to indicate its presence. In addition, an acknowledge signal must be sent back to the host computer when a drive select signal is sent from the host computer to the drive apparatus. In the conventional floppy disk drive apparatus, a means for detecting that the jacket having the floppy disk therein has been inserted in the disk receptacle is additionally provided. As such detecting means, a clamp knob, arranged outside the disk slot and operated to mount the floppy disk on the clamp of the spindle motor, is used and the operation of the clamp knob is checked to see if the jacket is inserted or not. Alternatively, an additional detector is arranged to detect that the jacket has been inserted inside the floppy disk drive apparatus.

However, in order to detect the clamp knob actuation or directly detect the insertion of the jacket, additional members must be arranged in the floppy disk drive apparatus, thus increasing its overall size and manufacturing cost.

SUMMARY OF THE INVENTION

It is an object of the present invention to provide a floppy disk drive apparatus wherein a floppy disk insertion state can be properly detected without increasing the overall size of the drive apparatus or its manufacturing cost.

In order to achieve the above object, there is provided a floppy disk drive apparatus comprising: a receptacle portion for receiving a jacket which has a notch on an edge portion thereof and houses a floppy disk with an index hole therein; a holding member for holding the floppy disk inserted in the receptacle portion; a disk driver for rotating the floppy disk held by the holding member; an index detector for generating an index detection signal when the jacket is inserted not to exceed a predetermined distance into the receptacle portion, or when the index hole is detected; a notch detector for generating a notch detection signal when the jacket is inserted not to exceed a predetermined distance into the receptacle portion, or when the notch of the jacket is detected; and a control circuit for generating a non-disk signal representing that the floppy disk is not inserted in the receptacle portion when detecting that the index detector generates the index detection signal when said notch detector starts generating the notch detection signal.

By utilizing both the output signals from the index hole detector and the notch detector, the non-disk signal representing that the floppy disk is not inserted in the receptacle portion can be generated. Therefore, the presence/absence of the floppy disk in the receptacle portion can be detected without using an additional detector.

DETAILED DESCRIPTION OF THE PREFERRED EMBODIMENTS

Figure 1A:
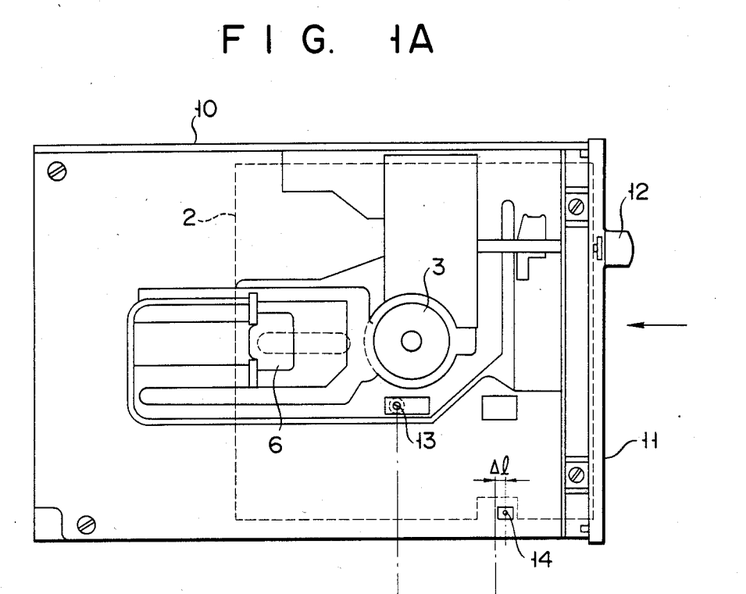
FIGS. 1A and 1B show a floppy disk drive apparatus according to an embodiment of the present invention and a floppy disk used therein, respectively.
Figure 1B:
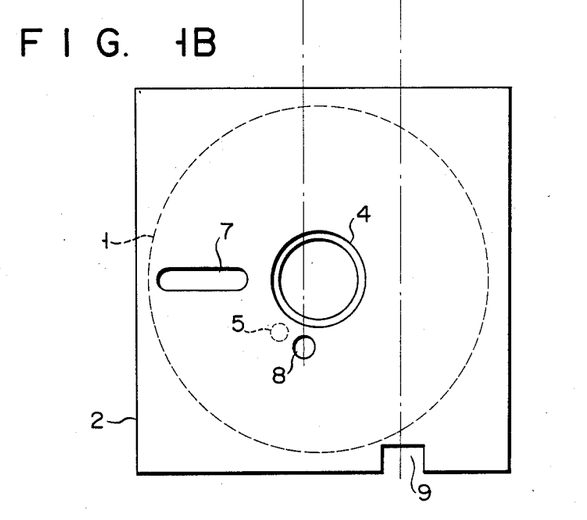

FIG. 1A is a side view of a floppy disk drive apparatus of the present invention when a side cover is removed, and FIG. 1B is a plan view of floppy disk 1 to be inserted in the drive apparatus. Disk 1 is housed in substantially square jacket 2. Mounting hole 4 is formed at the center of disk 1 to allow mounting of disk 1 on spindle motor shaft clamp 3 in the floppy disk drive apparatus. Index hole 5 is formed near hole 4. Elongated window 7 is formed in jacket 2 between the front side thereof and a central line parallel to the front side. Magnetic head 6 can be brought into contact with the recording surface of disk 1 through window 7. Index detection window 8 is formed in jacket 2 at a position slightly deviated from the central line toward window 7. Rectangular notch 9 is formed in jacket 2 at an edge portion opposite to window 8 with respect to the central line.

Disk receiving slot 11 is formed at the front face of housing 10. Clamp knob 12 is arranged outside slot 11. Index detector 13 formed of a light-emitting diode and a phototransistor is arranged at a position opposite to window 8 of jacket 2 when disk 1 housed in jacket 2 is completely inserted in the drive apparatus from slot 11 in the direction shown by the arrow in FIG. 1A. Notch detector 14 formed of a light-emitting diode and a phototransistor is arranged at a position opposite to notch 9 of jacket 2. The position of detector 14 is deviated from the center of notch 9 toward slot 11 by distance Δl.

When light is transmitted from the light-emitting diode to the phototransistor of index detector 13, detector 13 generates index signal IND of high level. However, when light from the light-emitting diode is shielded, index signal IND goes to low level. Similarly, when light from the light-emitting diode of notch detector 14 reaches the corresponding phototransistor, detector 14 generates high level write protect signal WP. However, when the light is shielded, signal WP goes to low level.

Figure 2:
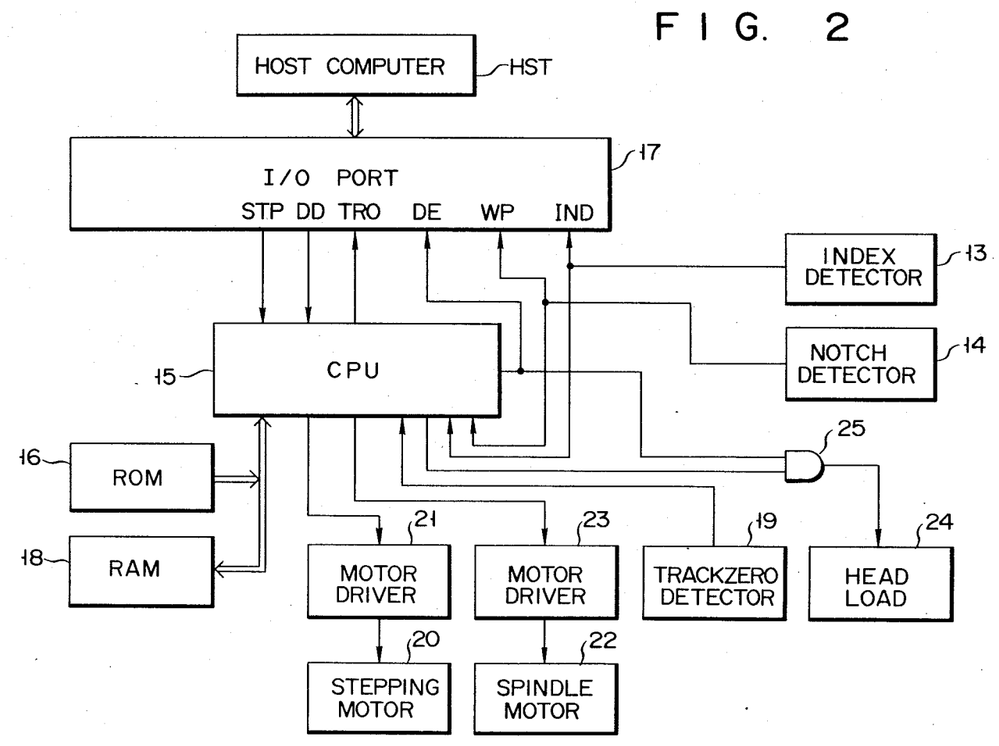
FIG. 2 is a block diagram of a control circuit in the floppy disk drive apparatus in FIG. 1A.

FIG. 2 is a block diagram showing the system configuration of the floppy disk drive apparatus. Magnetic head 6 and write and read circuits for accessing the floppy disk with head 6 are omitted since they are not directly associated with the present invention. CPU 15 is connected to ROM 16 for storing control programs, and to RAM 18 for temporarily storing the write data input from external host computer HST through I/O port 17 and readout data from disk 1. Spindle motor drive signal DD and stepping motor drive signal STP for controlling head 6 are supplied from host computer HST to CPU 15 through I/O port 17. Track zero signal TRO and insertion signal DE are sent from CPU 15 to host computer HST through I/O port 17. Signal TRO indicates that head 6 has reached the track zero position on the recording surface of disk 1. Signal DE indicates that disk 1 has been properly inserted in the disk receptacle portion. Signal DE has an inverted level of a disk removal signal.

CPU 15 respectively receives signals IND, WP and TRO from detectors 13, 14, and 19. Signals IND and WP are also sent to host computer HST through I/O port 17. CPU 15 supplies signal STP to driver 21 for motor 20, and signal DD to driver 23 for motor 22. CPU 15 also supplies head load signal HL to head load 24 through one input terminal of AND gate 25 to bring head 6 into contact with the recording surface of disk 1. The other input terminal of gate 25 receives signal DE from CPU 15.

Figure 3:
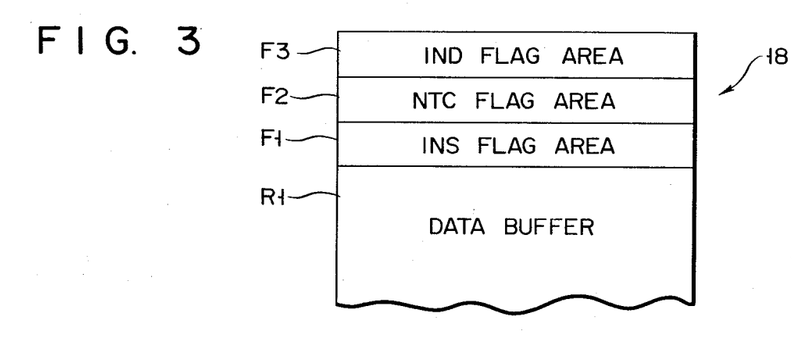
FIG. 3 is a memory map of a random access memory in the control circuit of FIG. 2.

As shown in FIG. 3, RAM 18 has data buffer R1 for temporarily storing data read out from disk 1, flag area F1 for storing insertion flag FLS, flag area F2 for storing notch detection flag FLN, and flag area F3 for storing index detection flag FLD. Flag FLS of "1" indicates that disk 1 is inserted in the disk receptacle portion, flag FLN of "1" indicates that notch detector 14 detects notch 9, and flag FLD of "1" indicates that index detector 13 detects index hole 5 of floppy disk 1.

Figure 4:
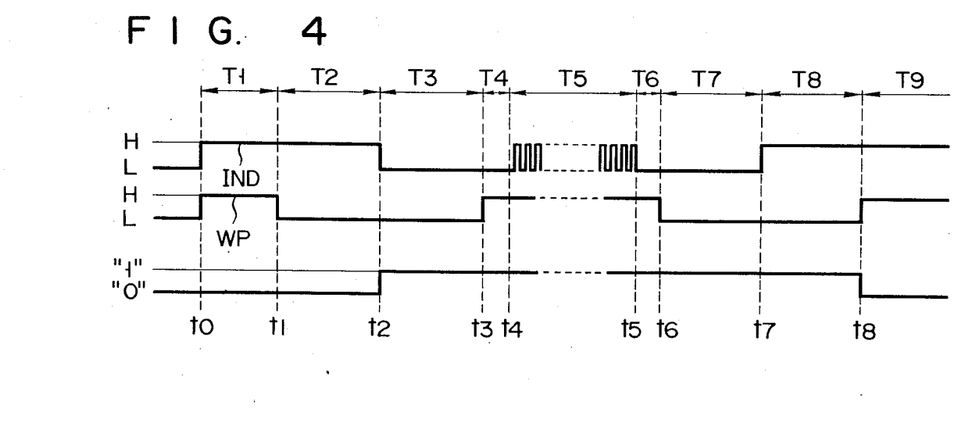
FIG. 4 is a timing chart for explaining the operation of the control circuit in FIG. 2.

FIGS. 4A to 4C respectively show states of signals IND and WP and flag FLS when floppy disk 1 is inserted in the floppy disk drive apparatus, rotated and removed.

When a power source voltage is supplied to the drive apparatus at time t0, signals IND and WP are set at a high level. When jacket 2 having floppy disk 1 therein is inserted in the disk receptacle portion and the front end of jacket 2 reaches detector 14 at time t1, signal WP becomes low. When the front end of jacket 2 reaches detector 13 at time t2, signal IND becomes low. When notch 9 of jacket 2 reaches notch detector 14 at time t3, signal WP goes high.

When floppy disk 1 is rotated for a period between times t4 and t5, index detector 13 generates a high level index signal IND whenever it detects index hole 5 of disk 1.

When the operator starts removing floppy disk 1 and notch 9 is moved away from detector 14 at time t6, signal WP becomes low. Subsequently, when the front end of jacket 2 is moved away from detector 13 at time t7, signal IND becomes high. When the front end of jacket 2 passes by notch detector 14 at time t8, signal WP becomes high.

Flag FLS is set at logic "1" in response to the trailing edge of signal IND. However, flag FLS is set at logic "0" in response to the leading edge of signal WP while signal IND is kept high.

Figure 5:
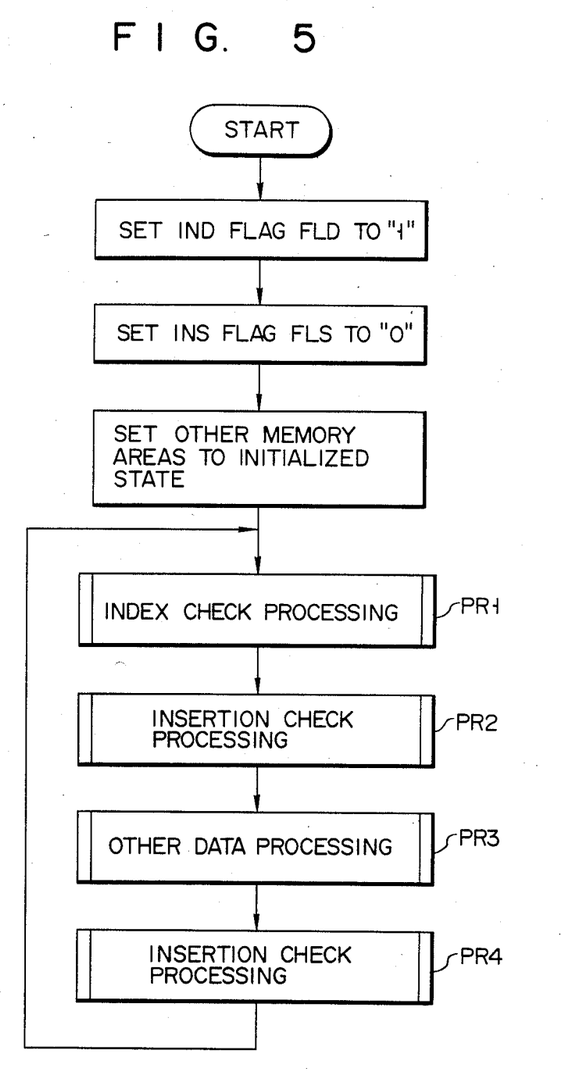
FIGS. 5 to 7 are flow charts for explaining the operation of the control circuit in FIG. 2.

FIG. 5 is a flow chart explaining the operation of CPU 15 shown in FIG. 2.

Figure 6:
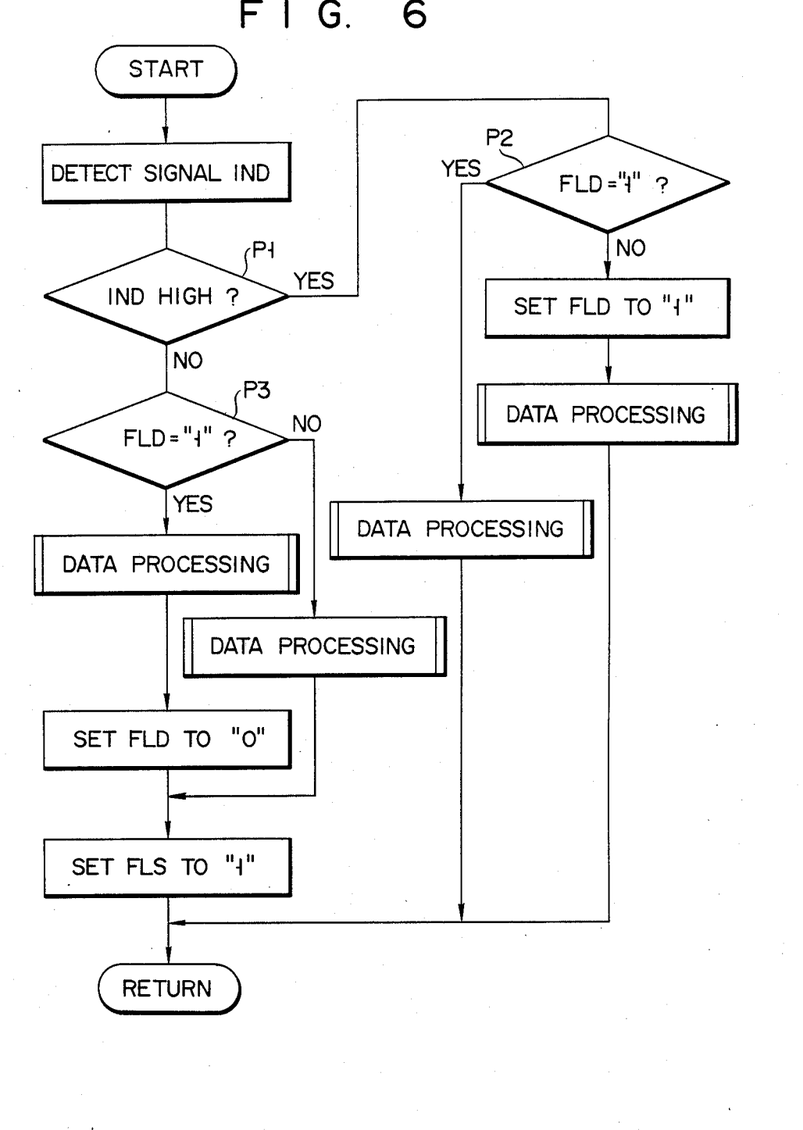

When the power source for the floppy disk drive apparatus is turned on, CPU 15 sets flag FLD in area F3 in RAM 18 to initialized logic "1", and resets flag FLS in area F1 to initialized logic "0". Buffer R1 and the like are cleared, and index check processing routine PR1 in FIG. 6 is performed. Referring to FIG. 6, CPU 15 checks the level of index signal IND from index detector 13 in step P1. A high level index signal may be detected in period T1 prior to the insertion of disk 1, period T2 during which disk 1 is being inserted, disk insertion period T5 in which index hole 5 is matched with window 8 of jacket 2, disk removal period T8, or period T9 after disk removal. If YES in step P1, the operation in step P2 is executed to check the logic state of flag FLD. When CPU 15 determines that flag FLD is already set at logic "1", e.g., CPU 15 detects flag FLD is kept at logic "1" for a predetermined period of time, an error signal or the like is generated. Thereafter, the flow returns to the main routine. However, when it is detected that flag FLD has been reset to logic "0", then it is changed to logic "1". When flag FLD is set twice within the predetermined period of time, data processing such as generation of a head load signal is performed. The flow then returns to the main routine.

CPU 15 may detect in step P1 that signal IND is set at a low level in periods T3 and T4 during which disk 1 is being inserted (FIG. 4), period T5 in which index hole 5 is not matched with window 8 of jacket 2, or initial removal periods T6 and T7. When NO in step P1, CPU 15 checks the logical state of flag FLD in area F3 in step P3. If flag FLD is determined to be set at logic "1", data processing such as a rotational speed check for motor 22 is performed. Flag FLD is then set at logic "0". Subsequently, flag FLS in area F1 is set at logic "1", and the flow returns to the main routine. However, when CPU 15 determines that flag FLD in area F3 is already set at logic "0", the logic level of flag FLD is held unchanged. In addition, when CPU 15 determines that flag FLD is kept at logic "0" for a predetermined period of time or longer, an error signal or the like is generated. At the same time, flag FLS is set at logic "1" and the processing returns to the main routine. In this manner, when CPU 15 detects that signal IND is set at low level, flag FLS is temporarily set at logic "1".

Figure 7:
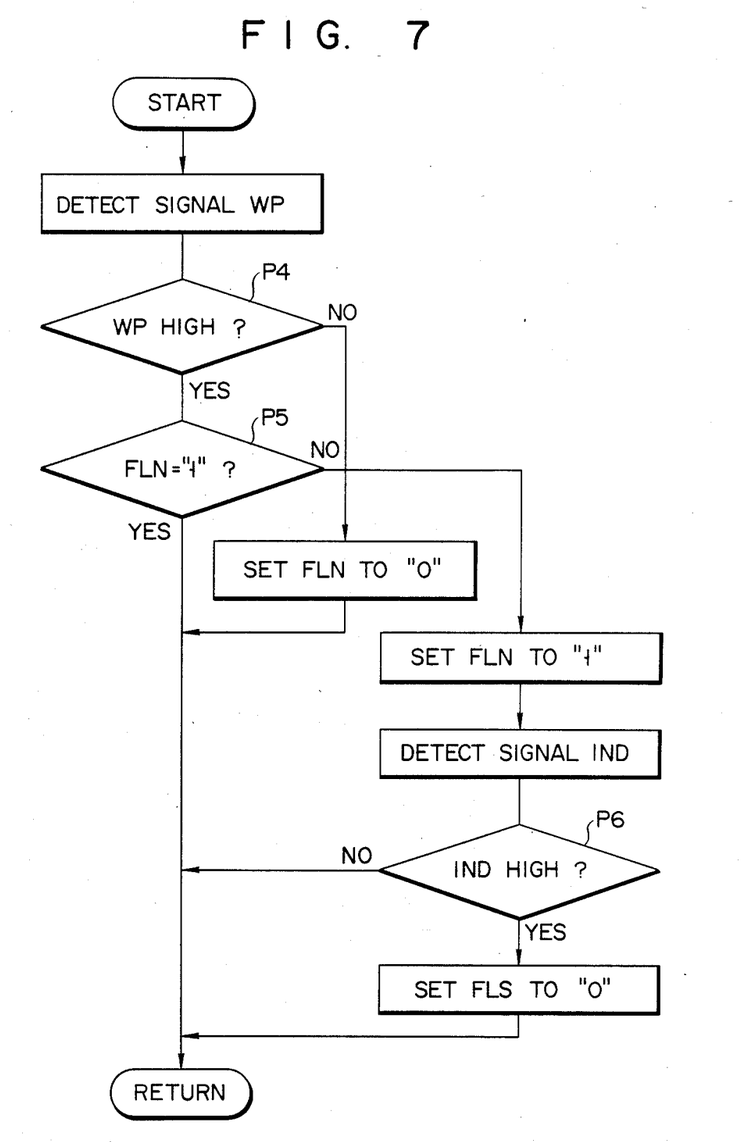

In the main routine of FIG. 5, after index check processing routine PR1 is completed, floppy disk insertion check processing routine PR2 in FIG. 7 is started. First, CPU 15 checks the level of signal WP from detector 14. CPU 15 may detect signal WP at high level in period T1 prior to the insertion of floppy disk 1, final insertion period T4, period T5 in which disk 1 is completely inserted, initial removal period T6, or period T9 after removal of disk 1, as shown in FIGS. 4A to 4C. If YES in step P4, i.e., if CPU 15 detects high level signal WP, CPU 15 checks the logical state of notch detection flag FLN in area F2 in step P5. If CPU 15 determines in step P5 that flag FLN is not set at logic "1", flag FLN is set P5 at logic "1". CPU 15 then detects signal IND from detector 13 again and checks its signal level in step 6. CPU 15 may detect signal IND of high level in the period of high level of both signals WP and IND, i.e., period T1, period T5 in which index hole 5 is matched with window 8, or period T9 after the removal of disk 1. If YES in step P6, flag FLS in area F1 is reset to logic "0".

However, low level signal IND may be detected in a period in which signal WP is set at high level and signal IND is set at low level, i.e., final insertion period T4, period T5 in which hole 5 is not matched with window 8, or initial removal period T6. In this case, the processing returns to the main routine.

When it is determined in step P5 that flag FLN in area F2 is set at logic "1", the current routine is determined as a second or subsequent routine in the duration in which the write protect signal is kept at a high level. The processing then returns to the main routine without checking the level of index signal IND.

If signal WP is determined in step P4 to be at a low level, flag FLN is set to a low level and the processing returns to the main routine.

In the main routine of FIG. 5, when floppy disk insertion check processing routine PR2 is completed, normal routine PR3 including read/write signal generation, motor on/off control, and track designation is performed, and then floppy disk insertion check processing routine PR4 which is the same as insertion check processing routine PR2 is executed. In this case, if routine PR4 is performed in the same duration as that of routine PR2, no processing is performed, and the processing returns to the main routine, as shown in FIG. 7.

When routine PR4 is completed, the processing returns to routine PR1 again.

In the floppy disk drive apparatus described above, as shown in FIGS. 4A to 4C, flag FLS goes high at time t2 at the trailing edge of signal IND during the insertion of disk 1. During removal of floppy disk 1, flag FLS goes low at time t8. While floppy disk 1 is inserted during period T5 between times t4 and t5, flag FLN is already set at logic "1" at time t3. Therefore, even if signal IND repeatedly changes between high and low levels in response to rotation of disk 1, the processing does not advance to step P6 in FIG. 7. As a result, flag FLS will not be reset to logic "0".

When the power source for the apparatus is turned on while the floppy disk is normally inserted in the disk receptacle portion thereof, i.e., when the power switch is turned on during period T5 of FIGS. 4A to 4C, disk 1 is rotated upon rotation of motor 22, and signal IND repeatedly changes between high and low levels. When the level of signal IND detected in routine PR1 is high, flag FLS is not set at logic "1". However, in the next period, flag FLS is set at logic "1" as soon as signal IND becomes low. In addition, when the power source switch is turned on, flag FLN is set at logic "1" in routine PR3. Thereafter, flag FLS is no longer reset to logic "0". Flag FLS is reset to logic "0" only for a moment after the power source switch is turned on. The possibility of stopping floppy disk 1 while index hole 5 is matched with window 8 is small, so the above state is unlikely to occur.

By detecting the logic level of flag FLS in area F1, the insertion or removal state of disk 1 can be determined. Since the insertion/removal of disk 1 can be detected by using the existing detectors 13 and 14, additional members are not required, thus obtaining a compact, low-cost apparatus.

Since notch 9 is normally larger than window 8, signal WP goes high earlier than signal IND in the final portion of insertion period. During the initial part of removal period, signal WP becomes low after signal IND has become low, and flag FLS is not set to logic "0" in step P6 of FIG. 7.

Since the position of detector 14 is deviated from the center of notch 9 toward slot 11 by distance Δl, signal WP becomes high prior to signal IND in the final part of insertion (t3 to t4), and becomes low after signal IND during the initial part of removal period (t5 to t6). Therefore, the removal state signal will not be generated during the disk insertion state.

Figure 8:
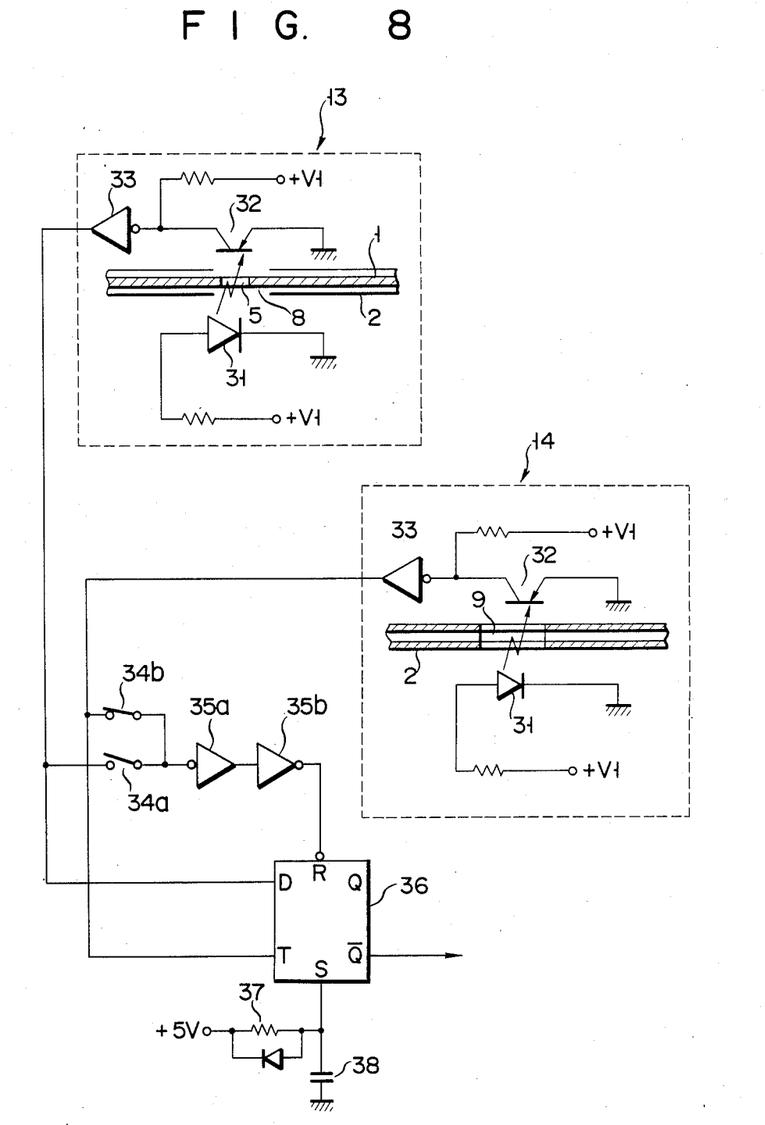
FIG. 8 is a circuit diagram of a control circuit in a floppy disk drive apparatus according to another embodiment of the present invention.

FIG. 8 shows a detector circuit in a floppy disk drive apparatus according to another embodiment of the present invention, which detects an insertion state of disk 1. Use of this detector eliminates flag areas F1 to F3 in RAM 18 of FIG. 3. In this embodiment, index detector 13 including light-emitting diode 31, phototransistor 32 and inverter 33 supplies index signal IND to inverted reset terminal R of D flip-flop 36 through switch 34a and inverters 35a and 35b, and to input terminal D thereof. Notch detector 14 having the same circuit arrangement as that of detector 13 supplies write protect signal WP to reset terminal R of flip-flop 36 through switch 34b and inverters 35a and 35b, and to input terminal T thereof. Switches 34a and 34b are not simultaneously, but alternately operated. An integrator circuit including resistor 37 and capacitor 38 is connected to set terminal S of flip-flop 36. When the power switch of the floppy disk drive apparatus is turned on, a DC voltage of +5 V is applied to one terminal of resistor 37 in the integrator circuit.

Figure 9:
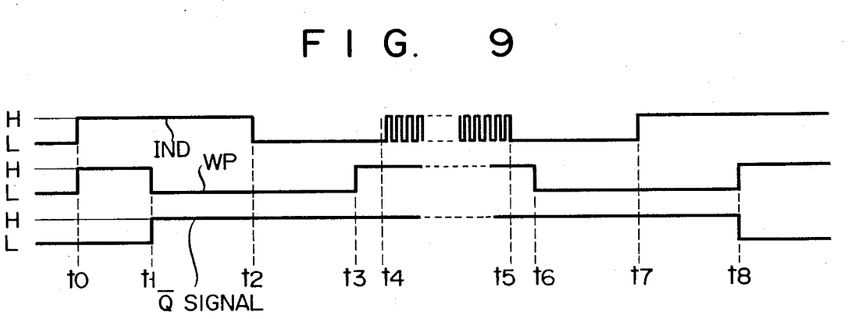
FIGS. 9 and 10 are timing charts for explaining the operation of the control circuit in FIG. 8.

The operation of the insertion state detector in the floppy disk drive apparatus described above will be described with reference to FIGS. 9 and 10. In the state wherein switch 34b is closed, as shown in FIG. 8, signal WP is supplied to terminal R of flip-flop 36 from detector 14. Flip-flop 36 is reset in response to the trailing edge of signal WP. Since terminal S becomes high immediately after a very short period of time set by the integrator has elapsed upon energization of the apparatus, flip-flop 36 is thus reset. Suppose that, under this condition, the power switch is turned on at time t0 and disk 1 is inserted at time t1. As shown in FIG. 9, signal WP becomes low at time t1, and flip-flop 36 is reset in response to the trailing edge of signal WP. The insertion state signal of high level appears at inverted output terminal $\bar{Q}$ of flip-flop 36. Thereafter, flip-flop 36 is kept reset. Signal WP supplied to terminal T of flip-flop 36 becomes high at time t8 as the final stage of removal of disk 1. Flip-flop 36 generates an output signal having the same level as that of signal IND (supplied to its terminal D) from output terminal $\bar{Q}$ thereof. The output signal from terminal $\bar{Q}$ becomes low at time t8. The $\bar{Q}$ output signal from flip-flop 36 is kept high during the period between time t1 to time t8. During periods before time t1 and after time t8, the $\bar{Q}$ output signal is set at low level, representing that disk 1 is not inserted. In the circuit of FIG. 2, instead of the output signal from CPU 15, the $\overline{Q}$ output signal from flip-flop 36 is supplied to one input terminal of AND gate 25 and input terminal DE of computer HST.

Figure 10:
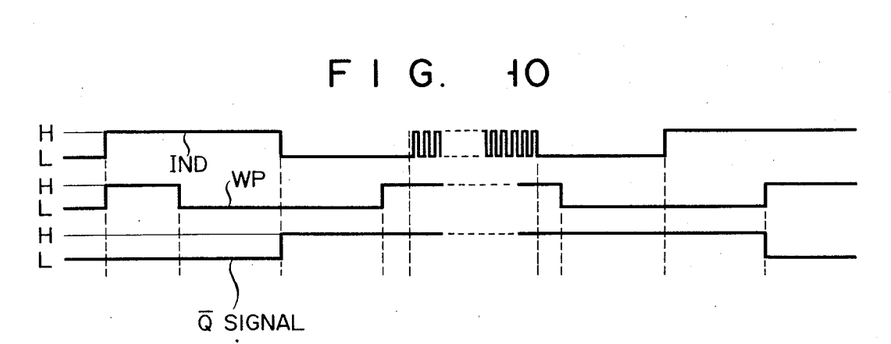

When switch 34b is turned off and switch 34a is turned on, signal IND is supplied to terminal R of flip-flop 36. As shown in FIG. 10, the insertion signal of high level is output from flip-flop 36 at time t2 signal IND falls while signal WP is kept at low level. In the same manner as in FIG. 9, the removal signal of low level is output at time t8 when the signal supplied to terminal T of flip-flop 36 becomes high in the final removal period of disk 1. Therefore, flip-flop 36 generates the high level insertion signal during the period between times t2 and t8. The removal signal of low level representing that disk 1 is not inserted is output for the periods before time t2 and after time t8.

In this manner, flip-flop 36 is used as an index signal storage means and an insertion/removal signal output means for the floppy disk to obtain the same effect as the previous embodiment.

What is claimed is:

1. A floppy disk drive apparatus comprising:
   a receptacle portion having a disk slot and receiving through the disk slot a jacket which has a notch on an edge portion thereof and houses a floppy disk with an index hole therein;
   a holding member for holding the floppy disk in said receptacle portion;
   disk drive means for rotating the floppy disk held in said holding member;
   index detecting means for generating an index detection signal when said jacket is inserted not to exceed a predetermined distance in said receptacle portion through a disk slot, or the index hole is detected;
   notch detecting means for generating a notch detection signal when said jacket is inserted not to exceed a predetermined distance in said receptacle portion through the disk slot, or the notch of said jacket is detected; and
   control means, connected to said index and notch detecting means, for generating a non-disk signal representing that the floppy disk is not inserted in said receptacle portion when detecting that said index detecting means generates the index detection signal when said notch detecting means starts generating the notch detection signal.

2. An apparatus according to claim 1, wherein said notch detecting means comprises a photocoupler arranged at a position deviated from a center of the notch of said jacket set in said receptacle portion toward the disk slot of said receptacle portion when said jacket is properly received in said receptacle portion.

3. An apparatus according to claim 2, wherein said index detecting means comprises a photocoupler located at a farther position than said notch detecting means with respect to the disk slot of said receptacle portion.

4. An apparatus according to claim 1, wherein said index detecting means comprises a photocoupler located at a farther position than said notch detecting means with respect to the disk slot of said receptacle portion.

5. An apparatus according to claim 1, wherein said notch detecting means comprises a photocoupler arranged at a position deviated from the center of the notch of said jacket set in said receptacle portion toward the disk slot of said receptacle portion; said index detecting means comprises a photocoupler located at a farther position than said notch detecting means with respect to disk slot of said receptacle portion; and said control means comprises a flag memory, and a control unit for setting a disk-on flag in said flag memory and generating a disk-on signal when said index detecting means stops generating the index detection signal, the disk-on flag being adapted to represent that the floppy disk is inserted in said receptacle portion, and for resetting the disk-on flag in said flag memory when the non-disk signal is generated.

6. An apparatus according to claim 1, wherein said notch detecting means comprises a photocoupler arranged at a position deviated from the center of the notch of said jacket set in said receptacle portion toward the disk slot of said reception portion; said index detecting means comprises a photocoupler located at a farther position than said notch detecting means with respect to the disk slot of said receptacle portion; and said control means comprises a signal generator for generating a disk-on signal representing that the floppy disk is inserted in said receptacle portion, in response to an interruption of the index detection signal from said index detecting means, and for generating the non-disk signal in response to generation of the notch detection signal from said notch detecting means while the index detection signal is generated from said index detecting means.

7. An apparatus according to claim 6, wherein said signal generator comprises a flip-flop.

* * * * *